United States Patent [19]

Hosoe et al.

[11] 4,443,086
[45] Apr. 17, 1984

[54] FOCUS ADJUSTING DEVICE

[75] Inventors: Kazuya Hosoe; Takao Kinoshita; Nobuhiko Shinoda; Shinji Sakai, all of Tokyo; Takashi Kawabata; Tadashi Ito, both of Kanagawa, all of Japan

[73] Assignee: Canon Kabushiki Kaisha, Tokyo, Japan

[21] Appl. No.: 330,438

[22] Filed: Dec. 14, 1981

Related U.S. Application Data

[63] Continuation of Ser. No. 150,958, May 19, 1980, abandoned.

[30] Foreign Application Priority Data

May 23, 1979 [JP] Japan .................................. 54-63373

[51] Int. Cl.$^3$ ........................ G03B 3/00; G03B 13/18
[52] U.S. Cl. .................................... 354/409; 354/401
[58] Field of Search ................ 354/25 R, 25 A, 25 P, 354/25 N, 31, 31 F, 53-55, 60 E, 60 L, 166, 195, 198-201, 289, 10; 352/140, 142, 170, 172; 250/225

[56] References Cited

U.S. PATENT DOCUMENTS

| | | | |
|---|---|---|---|
| 3,743,416 | 7/1973 | Widmer et al. | 354/198 X |
| 3,776,625 | 12/1973 | Fountain | 352/170 |
| 3,836,919 | 9/1974 | Matsumoto et al. | 354/25 |
| 3,995,289 | 11/1976 | Shono | 354/289 X |
| 4,048,642 | 9/1977 | Saito et al. | 354/60 L X |
| 4,083,056 | 4/1978 | Nakamura et al. | 354/25 |
| 4,230,401 | 10/1980 | Tokutomi et al. | 354/25 |
| 4,270,852 | 6/1981 | Suzuki et al. | 354/60 E X |
| 4,281,917 | 8/1981 | Kitagawa et al. | 354/60 E X |

FOREIGN PATENT DOCUMENTS

52-33527 3/1977 Japan ..................................... 354/25

Primary Examiner—William B. Perkey
Attorney, Agent, or Firm—Toren, McGeady and Stanger

[57] ABSTRACT

In the disclosed focus adjusting device, at least part of an image forming optical system and a focus adjusting mechanism is arranged within a housing attachable to and detachable from a camera body. A focus condition detector includes a photo-sensor disposed on a plane corresponding to the camera image plane, an electrical detection circuit connected to the photo-sensor, and a detecting optical system for forming an image of at least a part of the object on the surface of the photo-sensor. An aural indicator emits a sound to inform a photographer of the condition of the image formed on the surface of the predetermined focal plane as determined by the focusing condition detector.

7 Claims, 6 Drawing Figures

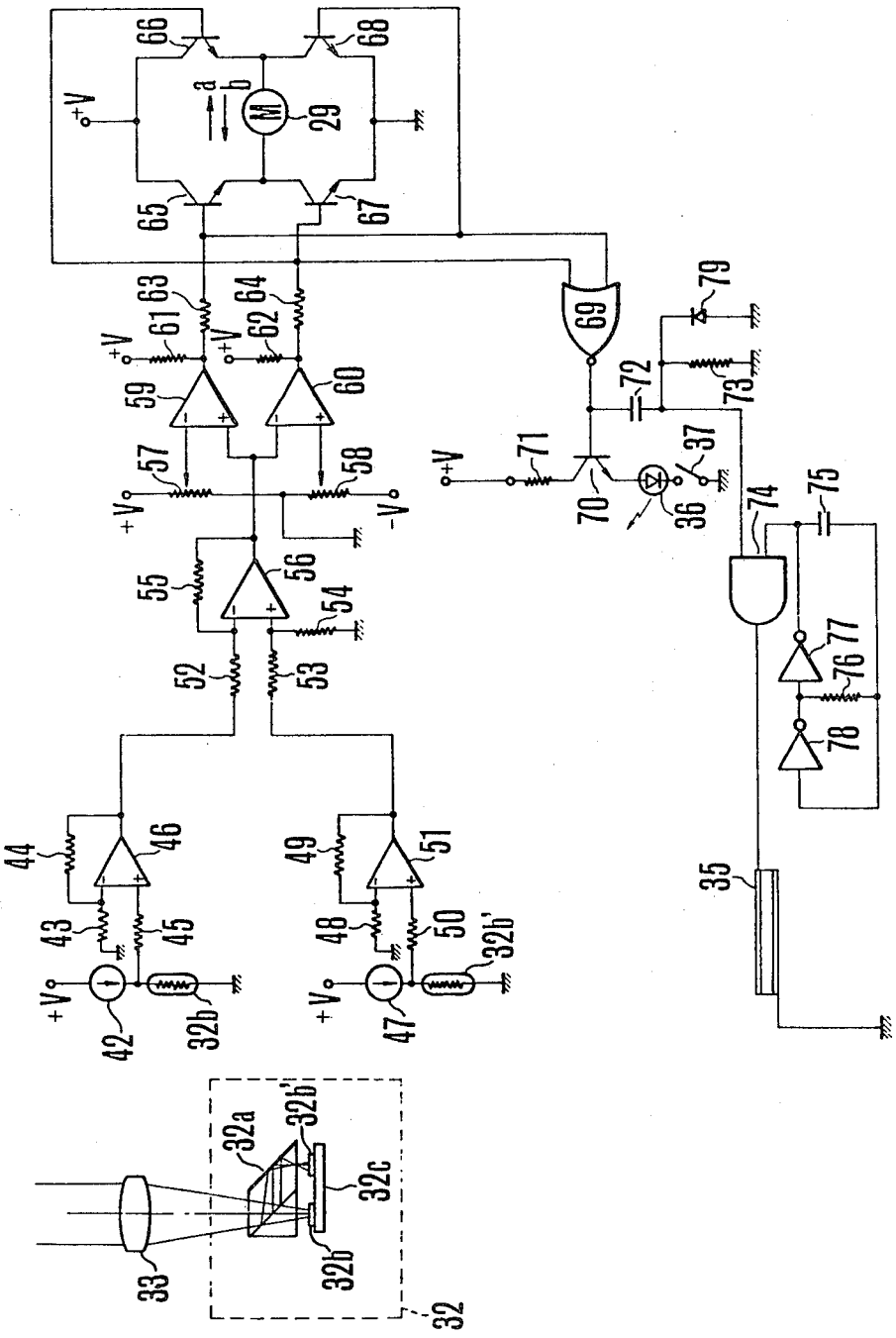

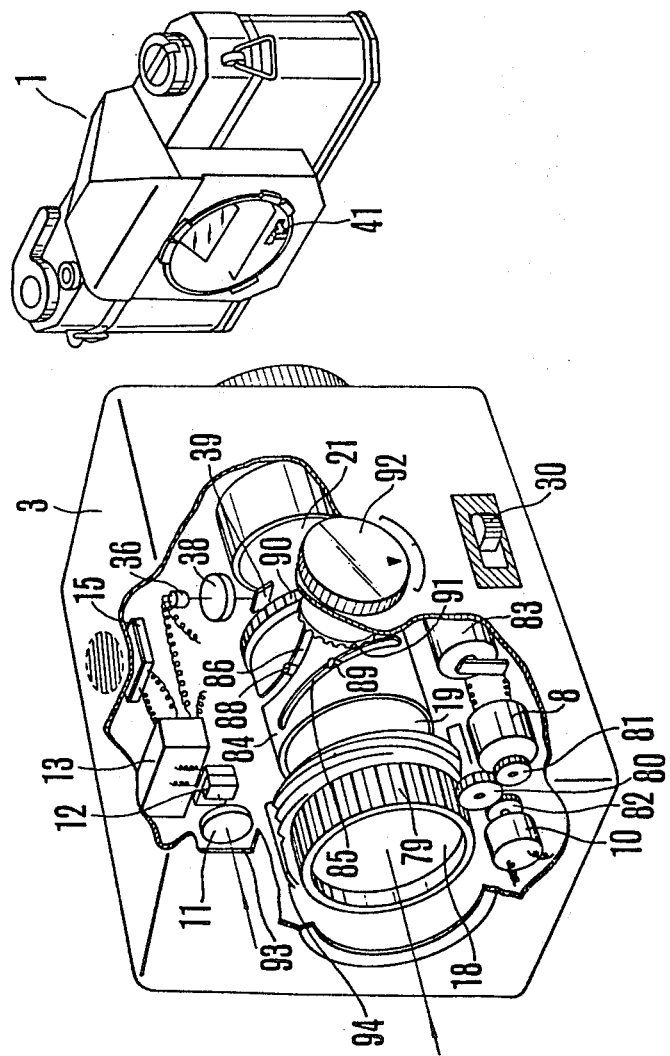

FOCUS ADJUSTING DEVICE

This is a continuation of application Ser. No. 150,958, filed May 19, 1980, and now abandoned.

BACKGROUND OF THE INVENTION

1. Field of the Invention

This invention relates to a focus adjusting device with a novel indicating arrangement and more particularly to a device having at least a part of an image forming optical system and a focus adjusting mechanism therefor located within a housing which is attachable to and detachable from a camera body.

2. Description of the Prior Art

Hitherto, various focus adjusting units of this type have been contrived. The conventional unit of this type has been arranged to transmit the focus adjusting condition of an image forming optical system to the camera body, for example, with focusing condition display elements disposed within the viewfinder and set up to be driven by the output of a focus condition detecting circuit disposed within the focus adjusting unit. However, a shortcoming of such a conventional unit is that its box or housing, which is attachable to and detachable from the camera body, must be connected to the latter by an electric cord. It is conceivable to arrange some light emitting means on the outside of the box to display the focus condition. However, in that case, the photographer is required to compare the information observed through the viewfinder with the display thus produced on the outside of the housing of the unit. The present invention is directed to the elimination of such shortcomings of the conventional arrangements.

SUMMARY OF THE INVENTION

It is therefore one of the principal objects of the invention to provide a focus adjusting device which enables the photographer to know the focusing condition while he keeps on watching the inside of a viewfinder of the camera.

It is another object of the invention to provide a device which is capable of displaying, within a viewfinder without requiring any modification on the part of a camera body, the focus adjusting condition of a focus adjuster arranged to be attachable to and detachable from the camera body.

It is a further object of the invention to provide a device which is capable of displaying, within the viewfinder of a camera body, the focus adjusting condition of a focus adjuster that is attachable to and detachable from the camera body and which requires no transmission member such as a signal transmission lead wire or a signal transmission pin between the camera body and the focus adjuster.

In an embodiment of the invention, the focus adjusting device which is arranged to be attachable to and detachable from a camera body is provided with a focus condition detecting means and also with an aural display means which displays, by a sound in accordance with a predetermined corresponding mode of aural display, a focusing condition detected by the focusing condition detecting means, to enable the photographer to know the focus condition while he keeps on peering into the viewfinder of the camera body. No transmission means is required between the camera body and the focus adjusting device.

In another embodiment of the invention, the focus adjusting device which is arranged to be attachable to and detachable from a camera body is provided with a focusing condition detecting means; a visual display member which displays, in accordance with a predetermined corresponding mode of visual display, a focus condition detected by the focus condition detecting means; and a display optical system arranged to guide the information being produced by the visual display member into a viewfinder optical path of the viewfinder of the camera body. This arrangement also enables the photographer to know the focusing condition while peering into the viewfinder in the same manner as in the foregoing embodiment example. Besides, in this case, all information can be displayed in a concentrated manner within the viewfinder. Furthermore, compared with an optical focusing mechanism arranged within a viewfinder optical system, an in-focus condition can be found more readily and more precisely. The embodiment of course also obviates the necessity of any signal lead wire or the like between the camera body and the focus adjusting device.

These objects, features and advantages of the invention will become apparent from the following detailed description of embodiments of the invention taken in connection with the accompanying drawings.

BRIEF DESCRIPTION OF THE DRAWINGS

FIG. 3 is a schematic view showing essential parts within the focusing condition detecting means of the invention including an image forming optical system for detection and a focus detecting unit.

FIG. 4 is a circuit diagram showing by way of example the arrangement of a detecting electrical circuit provided within the invented focusing condition detecting means and a driving circuit for a visual display member and an aural display means.

FIG. 6 is an oblique view showing the arrangement of the focus adjusting device which is attachable to and detachable from a camera body and is schematically shown in FIG. 1.

DETAILED DESCRIPTION OF PREFERRED EMBODIMENTS

Figure 1:
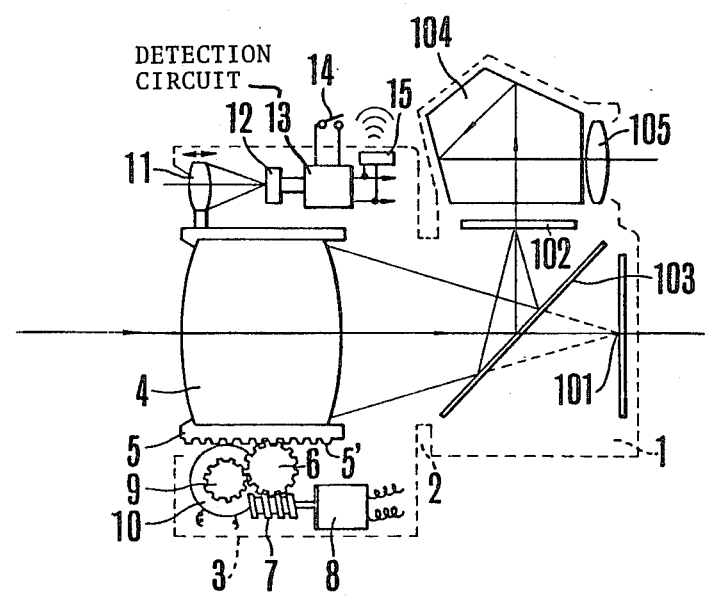
FIG. 1 is a schematic view showing a focus adjusting device attachable to and detachable from a camera body as the first embodiment example of the invention.

FIG. 1 which schematically shows an embodiment of the invention includes a camera body 1; a mounting part 2 of the camera body; a box body or box or housing 3 which is arranged to be attachable to and detachable from the camera body 1; an image forming optical system 4; a lens barrel 5; a rack 5'; pinions 6 and 9; a worm gear 7; a motor 8 for driving the image forming optical system 4; a potentiometer 10 which is arranged to produce a signal representative of the position of the image forming optical system 4; a detection image forming optical system 11; a focus detection unit 12 which unifies a beam splitter and a photo-sensitive means as a part of the detection image forming optical system and which is secured to the inside of the housing 3; an electrical detection circuit 13 provided for detection; a power source switch 14; and a sound emitting body or element 15 employed as an aural display unit. A light sensitive film material 101 is placed on a predetermined focal plane of the image forming optical system 4. The film 101 of course may be replaced with a image pickup tube or an image pickup element. A focusing plate 102 is placed in a position optically equivalent to the above stated predetermined focal plane. In addition to these parts, there are also provided a pentagonal dach or roof prism 104, a eyepiece 105 and a quick return mirror 103.

As shown, a light coming from an object to be photographed passes through the image forming optical system 4 and then is reflected by the quick return mirror 103 to be imaged on the surface of the focusing plate 102. The image formed on the surface of the focusing plate 102 passes through the pentagonal roof prism 104 through a condenser lens or the like which is not shown and is visible through the eyepiece 105. On the other hand, the detection image forming optical system connected to the lens barrel 5 is arranged to be displaced as the lens barrel 5 moves, that is, according to the movement of the image forming optical system in the direction of its optical axis such that the displacement of the detection image forming optical system causes an image forming condition on a photo-sensitive means provided within the focus detecting unit to coincide with an image forming condition on the predetermined focal plane of the image forming optical system. Information on the focus adjustment detected by the focus detecting unit 12 is processed as a signal at the electrical detection circuit 12. The sound emitting body 15 is driven according to the result of the process performed by the circuit 13. The sound emitting body 15 then produces an aural indication in accordance with a predetermined aural mode of indication. The motor 8 is driven in accordance with information on focus adjustment detected by the electrical detection circuit 13. After that, focus adjustment is performed with the image forming optical system 4 operated in the direction of its optical axis by the rack 5' through the worm gear 7 and pinion 6. Then, the extent of displacement of the rack 5' is derived in the form of an electrical signal from the potentiometer 10 with the potentiometer concurrently being rotated through the pinions 6 and 9.

Figure 2:
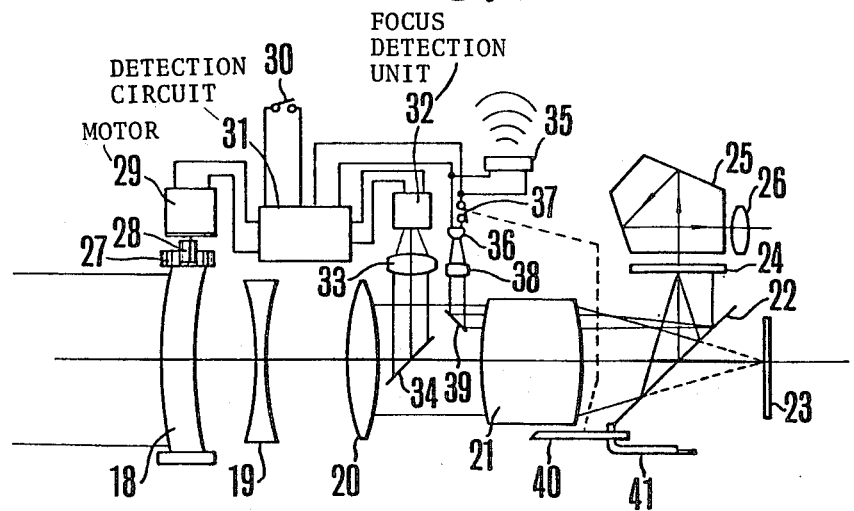
FIG. 2 is a schematic view showing a focus adjusting device attachable to and detachable from a camera body as the second embodiment example of the invention.

In the second embodiment of the invention which is shown in FIG. 2, a zoom type image forming optical system 18–21 is formed by a focusing lens 18, a varifocal lens system 19 and 20 and a relay lens 21. This embodiment includes a quick return mirror 22, a film 23, a focusing plate 24, a pentagonal roof prism 25, an eyepiece 26, and a focusing lens holding member 27. The focusing lens holding member 27 is provided with a rack which is arranged to move the focusing lens in the direction of the optical axis. Also provided are a pinion 28; a motor 29; a power source switch 30 for the focus detecting system (the power source is not shown); an electrical detecting circuit 31; a focus detecting unit 32 which is arranged in the same manner as the focus detecting unit 12 shown in FIG. 1; a relay lens 33 which serves for focal point detection; a half mirror 34; a sound emitting body or element 35; a light emitting body 36; a switch 37 for extinguishing the light emitted by the light emitting body, a light projecting lens 38, a small half mirror 39, a diaphragm driving pin 40 which is interlocked with an automatic aperture stopping lever and is arranged to open the switch 37 to stop the light emission of the light emitting body 36; and the automatic aperture stopping lever 41.

In the second embodiment as shown in FIG. 2, unlike the first embodiment, the focus detecting optical system is not arranged separate from the image forming optical system but is taken from a part of the image forming optical system.

While the first embodiment is arranged to display an in-focus condition solely by means of the sound emitting body, the second embodiment is arranged to display it not only with the sound emitting body but also with a light emitting body. As a result of this arrangement, the light emission by the light emitting body 36 is stopped by opening the switch 37 through the diaphragm driving pin which is interlocked with the automatic aperture stopping lever. This is necessary for preventing unnecessary light from straying into the image forming optical system during a photographic operation.

In this embodiment, therefore, when the switch for the focus detecting system is turned on, an image of the object to be photographed comes from the half mirror provided on the optical axis of the image forming optical system and is formed on the surface of the focus detecting unit 32 through the relay lens 33. The output of the focus detecting unit 32 is supplied to the electrical detection circuit 31, which determines whether or not an in-focus condition exists. The driving operation on the motor 29 is controlled in accordance with the determination. Then, the position of the focusing lens 18 is adjusted as necessary through the pinions 28 and the rack 27.

In this focus adjusting process, the electrical detection circuit 31 produces an instruction signal for displaying the focusing condition. Then, the light emitting body 36 and the sound emitting body 35 are operated to effect displays in predetermined patterns respectively. The light emitted by the light emitting body 35 is then projected on the focusing plate 24 (or a reticle) through the light projecting lens 38, the small half mirror 22 to enable the photographer to see the focus adjusting condition within the viewfinder. Further, as stated in the foregoing, the diaphragm driving pin which is interlocked with the automatic aperture stopping lever stops the light emitting body from emitting the light to ensure that no excessive light strays into the image forming optical system during a photographing operation.

The arrangement allows the photographer readily to see the display of an in-focus condition within the viewfinder. Since the detection image forming optical system is using a part of the optical path of the image forming optical system, it is unnecessary to provide any additional means on the outside of the camera body for transmission signals between the camera body and the focus adjusting device which is arranged to be attachable to and detachable from the camera body. Therefore, the camera is free from the undesirable effects of external light, etc.

FIG. 3 which explains the optical relation of the photosensitive means to the beam splitter employed as a part of the detection image forming optical system includes a relay lens 33 arranged as a part of the detection image forming optical system; a beam splitter 32a which is also arranged as a part of the detection image forming optical system; light sensitive elements 32b and 32b' which are arranged as the above stated means for photo-to-electric conversion; and a base plate for carrying two light sensitive elements 32b and 32b'. They are arranged into one focus detecting unit. The beam splitter 32a is arranged to split incident light into two, for example, with a semi-transparent part, to make the split light strike the two light sensitive elements. In this instance, the images formed at the two light sensitive elements are arranged by the beam splitter 32a to have a predetermined equal optical path difference across a predetermined focal plane in the direction of the optical axis. Hence, the images formed at the two light sensitive elements have equal degrees of sharpness when a focal point is in the middle of the equivalent positions of the two light sensitive elements on the optical axis. They exhibit a difference between them in the degree of sharpness as the focal point deviates from the middle point forward or backward.

FIG. 4 is a circuit diagram showing by way of example the electric detection circuit employed in the second embodiment and the interrelation of the light sensitive elements, the motor, the sound emitting body and the light emitting body. In this example, photoconductive elements such as CdS are employed as the light sensitive elements 32b and 32b. The resistance value of the CdS is arranged to correspond to the sharpness of the object to be photographed. Two constant current sources 42 and 47 are each connected in series to each of the photoconductive elements. A symbol +V indicates each power source. Reference numerals 43-45 indicates resistors and 46 indicates an operational amplifier. The resistors 43-45 and the amplifier 46 jointly form a non-inverting amplifier. The non-inverting input terminal of the operational amplifier 46 is connected to a connection point between the photoconductive elements 32b and the constant current source 42 through the resistor 45. The inverting input terminal of the operational amplifier 46 is grounded through the resistor 43. The inverting input terminal is also connected to the output terminal of the amplifier 46 through the resistor 44. Another non-inverting amplifier is formed in like manner by elements 48-51, of which the element 51 is an operational amplifier. The non-inverting input terminal of the operational amplifier 51 is connected to a connection point between the photoconductive element 32b' and the constant current source 47. The inverting input terminal of the amplifier 51 is grounded through a resistor 48 and is also connected to the output terminal of the operational amplifier 51 through a resistor 49.

A differential amplifier is formed by elements 52-56 including an operational amplifier 56. The inverting input terminal of the operational amplifier 56 is connected to the output terminal of the operational amplifier 46 through a resistor 52 while the non-inverting input terminal of the amplifier 56 is connected to the output terminal of the operational amplifier 51 through a resistor 53. Further, the non-inverting input terminal of the operational amplifier 56 is grounded through a resistor 54. The non-inverting input terminal of the operational amplifier 56 is also connected to the output terminal of the amplifier 56 through a resistor 55. A window comparator is formed by elements 57-60 including comparators 59 and 60. The non-inverting input terminals of the two comparators 59 and 60 are connected to the above stated operational amplifier 56 while the inverting input terminals of these comparators 59 and 60 are respectively connected to the voltage dividing points of voltage dividing resistors 57 and 58. Numerals 61-64 indicate resistors. NPN transistors 65-68 form a bridge for controlling the normal and reverse rotations of the motor 29. The base of the transistor 65 is connected to the power source +V through resistors 61 and 63 which are connected in series. A connection point between the resistors 61 and 63 is connected to the output terminal of the comparator 59. The base of the transistor 67 is connected to the power source +V through resistors 62 and 64 which are connected in series. The connection point between the resistors 62 and 64 is connected to the output terminal of the above stated operational amplifier 60. The resistors 63 and 64 are protecting resistors which limit currents flowing to these transistors. The collector of the transistor 65 is connected to a power source while its emitter is connected to the collector of the transistor 67. The emitter of the transistor 66 is connected to the collector of the transistor 67. The emitter of the transistor 67 is grounded. The collector of the transistor 66 is connected to a power source and the emitter thereof to the collector of the transistor 68 which has its emitter grounded. The emitter of the transistor 65 has one terminal of the motor 29 connected thereto while the other terminal of the motor is connected to the collector of the transistor 68. The transistors 65 and 68 have a base in common with each other while the transistors 66 and 67 also have a base in common.

A NOR gate 69 has two inputs. The input terminals of the NOR gate 69 are respectively connected to the bases of the transistors 65 and 67. Another NPN transistor 70 has its collector connected to a power source +V and its emitter grounded through a light emitting diode 36 which is employed as a light emitting body. The light emitting diode 36 and the ground have the switch 37 shown in FIG. 2 connected in series therebetween. The base of the transistor 70 is grounded through a capacitor 72 and a resistor 73. The cathode of the diode 79 is connected to the connection point between the above stated resistor 73 and the capacitor 72 while the anode thereof is grounded. A numeral 74 indicates a two input AND gate which has one of its input terminals connected to a connection point between the above stated capacitor 72 and the resistor 73. An inverter 78 has its input terminal connected to the output terminal of an inverter 77 through a resistor 76 and its output terminal to the input terminal of the inverter 77. The output terminal of the inverter 77 is connected to the input terminal of the inverter 78 through a capacitor 75. The output terminal of the inverter 77 is also connected to the input terminal of the inverter 78 through a capacitor 75. The output terminal of the inverter 77 is also connected to the input terminal of the other input terminal of the AND gate 74. The elements 75-78 form an oscillation circuit. A numeral 35 indicates a sound emitting body which is employed as an aural display device. One input terminal of the sound emitting body is connected to the output terminal of the above stated AND gate 74 while the other input terminal of the sound emitting body is grounded. The electrical detection circuit arranged in this manner operates as follows:

The respective photoconductive elements 32b and 32b' have constant current sources connected in series thereto. The resistance values of the element 32b and 32b' are detected in the form of voltage values and are amplified by the non-inverting amplifier composed of elements 43-46 and non-inverting amplifier composed of elements 48-51 before they are supplied to the differential amplifier consisting of the elements 52-56. The differential amplifier produces a difference output. The level of the difference output is judged by the window comparator which is composed of the elements 57-60 arranged at the next stage. The upper threshold value is determined by the variable resistor 57 connected to the inverting input terminal of the comparator 59 while the lower threshold value is determined by the resistor 58 connected to the non-inverting input terminal of the comparator 60 to judge the level of the output of the differential amplifier 56 in three steps. In other words, the level is judged in three steps including a level higher than the upper threshold value, a level between the upper and lower threshold values and a level lower than the lower threshold value. The upper and lower threshold values are positive and negative values which are of about equal absolute values. When the level is within this range, it is considered to represent an in-focus condition. The level is considered to represent an in-focus condition. The level is considered representative of a focused condition having a focus in the rear of the predetermined focal plane when it is above the upper threshold value and another focused condition having a focus in front of the predetermined focal plane when it is below the lower threshold value. The level of the output of the comparator 59 becomes high and that of the output of the comparator 60 becomes low when the output of the differential amplifier is above the upper threshold value. The output levels of both the comparators 59 and 60 become low when the output level of the differential amplifier is between the upper and lower threshold values. The output level of the comparator 59 becomes low and that of the comparator 60 high when the output level of the differential amplifier is lower than the lower threshold value.

Therefore, with the focusing lens arranged to be driven by an electric motor as in the case of this embodiment, only the transistors 65 and 68 in a normal/reverse motor operation controlling bridge are turned on in the case of a far-focus condition. This causes a current flowing in the direction of "a" as shown in the drawing to flow to the motor 29 which then moves the focusing lens 18 to the right as viewed in FIG. 2. Under an in-focus condition, all of the transistors 65–68 are off. Under a near-focus condition, only the transistors 66 and 67 are turned on to cause current flowing in the direction of "b" as shown in FIG. 4 to flow to the motor 29, which then moves the focusing lens 18 to the left as viewed in FIG. 2. Further, under the near-focus and far-focus conditions, the level of the output of the NOR gate 69 is low. It becomes high only under an in-focus condition. Therefore, if the switch 37 is on in the in-focus condition, the light emitting diode 37 is turned on to visually display the in-focus condition. The AND gate 74 is supplied with a high level signal for a fixed period of time determined by the capacitor 72 and the resistor 73 after the level of the output of the NOR gate 69 becomes high. Then, the output of the oscillator formed by the elements 75–78 is arranged to be supplied to the sound emitting body 35. Then, a sound is emitted for a predetermined period after detection of an in-focus condition by the window comparator to let the photographer aurally know of the in-focus condition.

The light emitting diode (LED) 36 remains lit during the in-focus condition and is arranged to be put out in response to movement of a known automatic aperture stopping level which is driven into a predetermined aperture position by a shutter release operation. Therefore, it is possible to preclude the light of the LED from reaching the surface of the film as stray light.

Figure 5:
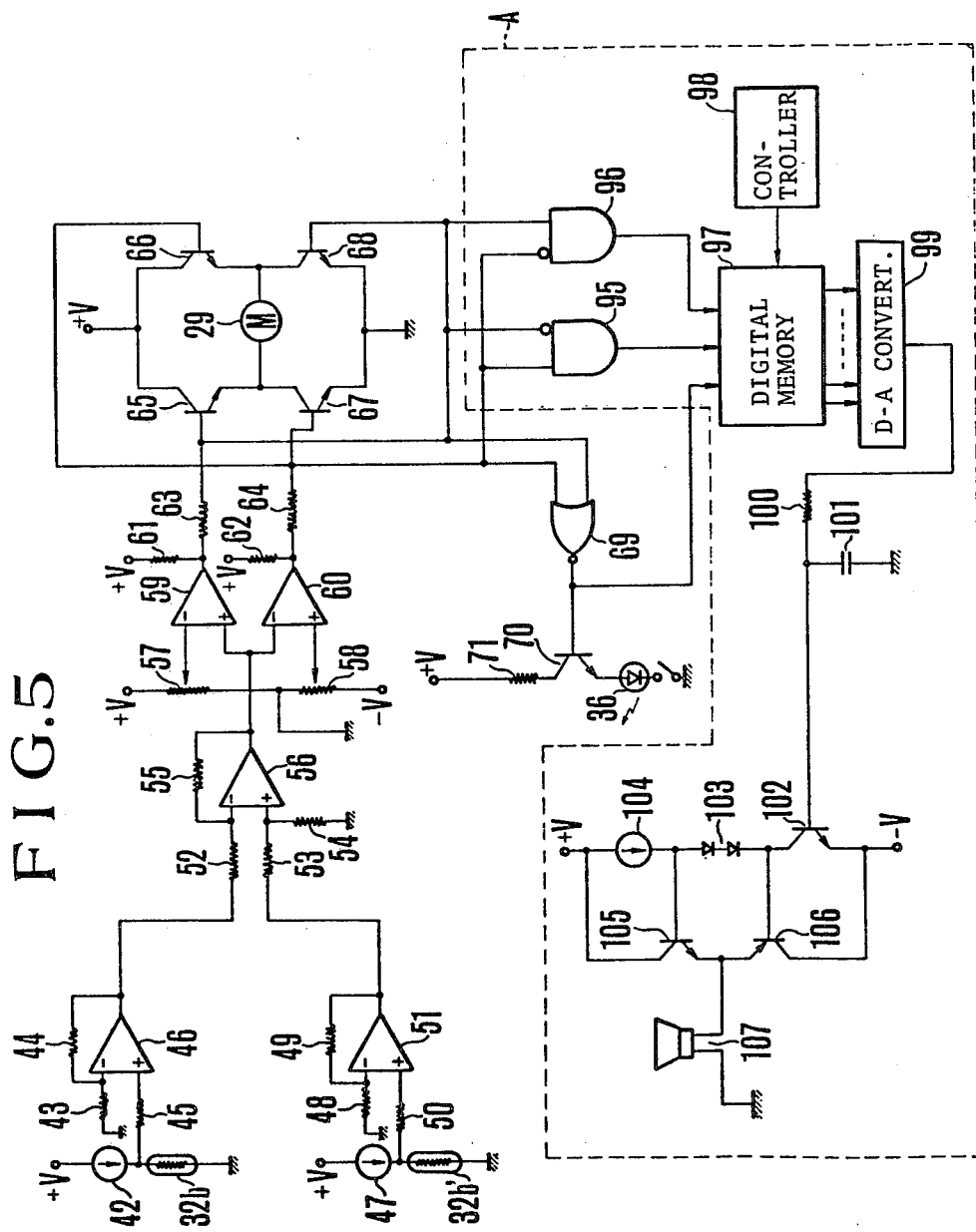
FIG. 5 is a circuit diagram showing a modification example of the arrangement of the detecting electrical circuit and the driving circuit for the visual display member and the aural display means shown in FIG. 4.

FIG. 5 shows a third embodiment of the invention and is a modification of the arrangement shown in FIG. 4. In this case, the sound emitting body is arranged not only to produce an aural indication at a predetermined frequency but also to indicate, by predetermined sound patterns, an in-focus condition and the directions in which deviations took place from the in-focus condition. The elements which are the same as the corresponding ones shown in FIG. 4 are indicated by the same reference numerals. The operation of the third embodiment is also the same as the arrangement shown in FIG. 4. Therefore, the following description covers only the part enclosed by a broken line in FIG. 5. Here, an AND gate 95 goes high when the output of the comparator 60 becomes high and the output of the comparator 59 becomes low, that is, when a near-focus condition obtains. Another AND gate 96 goes high when the level of the output of the comparator 60 becomes low and the output of the comparator 59 becomes high, that is, when a far-focus condition exists.

Thus, the AND gate 95 is high in the near-focus condition; the output of the AND gate 96 is high in a far-focus condition; and the output of NOR gate 69 is high in an in-focus condition.

Numeral 97 indicates a digital memory which is of the type known to be usable for a word learning machine or for displaying word patterns in a calculator for blind people. The digital memory is arranged to sample timewise analog time serial sound patterns such as desired words memorized beforehand and to store the signal output obtained at each point of time in sampling in a digitized form.

This digital memory turns on in response to the selective high output levels of the above stated AND gates 95 and 96 and the NOR gate 69. Thus, the memorized address regions of at least three kinds of sound patterns are selectable.

A controller 98 is arranged to cyclically produce the selected address regions within the digital memory 97 is a predetermined sequence.

The output of the digital memory 97 is converted into an analog value by a D/A converter. Then, the envelope of the output of the D/A converter 99 is taken out through a low-pass filter formed by a resistor 100 and a capacitor 101 to obtain an audio frequency output. A power amplifier includes an NPN transistor 102, a diode 103, a constant current source 104, an NPN transistor 105 and a PNP transistor 106. The sound emitting body 107 is in the form of a speaker or the like. The speaker 107 has its one terminal grounded and the other terminal connected to a connection point between the emitter of the transistor 105 and that of the transistor 106.

With the embodiment arranged in the manner as described in the foregoing, the normal/reverse rotation control bridge is selectively driven or stopped in two directions in accordance with the three different kinds of outputs of the window comparator. Accordingly, three kinds of sound patterns are produced. In addition to that, the light emitting diode is also arranged to be lit by turning on the switch 37 in an in-focus condition.

In this embodiment, the output of the digital memory is used for an aural display in words or the like. However, this may be replaced with mere combinations of sounds. Further, it goes without saying that one or a plurality of display elements such as light emitting diodes may be used for displaying a predetermined pattern.

Referring now to FIG. 6, which obliquely shows a focus adjusting device as a further embodiment example of the invention, the parts indicated by the same reference numerals as those used in FIG. 1–FIG. 5 are identical with the corresponding parts shown in FIGS. 1–5 and, therefore, are omitted from the following description.

FIG. 6 includes a lens barrel 79 which is arrranged to carry the focusing lens 18 and has a helicoidal part and a gear tooth part; pinions 80–82; a power source 83; a rotatable lens barrel 84 which is equipped with cams 86 and 85 for adjustment of the vari-focal system and has a gear part 90; cam followers 88 and 89 linked to the lens holding parts of the vari-focal system; a crown gear 91 which engages the gear 90; a zooming dial 92 which rotates together with the crown gear 91; a light flux entrance window 93 for light flux coming into the focus detection system; and a focusing lens holding member 94 which engages the helicoidal part. The mechanism related to automatic focusing operates in about the same manner as in the first embodiment with the exception that: a mechanism for a zooming system as shown in FIG. 6 is additionally provided. However, this additional mechanism is of known structure and, therefore, is omitted from description here.

As described in detail in the foregoing, the advantages of the invention are:

1. A means for displaying a signal representative of focusing conditions or giving instructions therefor is disposed within the housing which contains the focusing control system and is arranged to be attachable to and detachable from the camera body to enable the photographer to know that an in-focusing condition has obtained. This arrangement does not require any modification on the part of the camera body and thus permits one to obtain such focusing signals in an existing camera. The photographer can know not only the in-focus condition but also the direction of focusing deviation from an in-focus point, so that a photographic operation can be speedily carried out without fail by releasing the shutter after focusing.

2. With the sound emitting body employed as means for display or for giving instructions, the photographer can be allowed to concentrate his visual sense on picture composition continuously peering into the viewfinder.

3. In addition to the above stated aural display, provision of means for displaying an in-focus condition within the viewfinder for visual confirmation further ensures photography in an in-focus condition.

4. With the instructions given by the sound emitting body arranged to be effected not in a monotone but in certain patterns consisting of a plurality of sounds combined according to focusing conditions, the arrangement further facilitates confirmation of the focusing conditions.

5. With the display within the viewfinder also arranged to be effected in certain patterns consisting of a plurality of displays combined according to the focusing conditions, the arrangement further facilitates the visual confirmation of focusing conditions.

What is claimed is:

1. An automatic focusing lens assembly for use with a camera body, comprising:
    (a) a focus adjustable lens system;
    (b) an automatic focusing device for automatically focusing said lens system onto an object to be photographed;
    (c) aural indication means coupled to said automatic focusing device to aurally indicate the focusing condition of the lens system with respect to the object, said aural indication means being arranged to produce respectively different indications indicative of in-focus and out-of-focus conditions of the lens system;
    visual indication means coupled to said automatic focusing device to visually indicate the focusing condition of the lens system with respect to the object; and
    guide means for guiding the visual information generated by said visual indication means into said camera body.

2. A lens assembly according to claim 1, wherein said visual indication means is arranged to operate only when the lens system is adjusted to an in-focus condition with respect to the object by said automatic focusing device.

3. An automatic focusing lens assembly for use with a camera body, comprising;
    (a) a focus adjustable lens system;
    (b) an automatic focusing device for automatically focusing said lens system onto an object to be photographed;
    (c) visual indication means coupled to said automatic focusing device to visually indicate the focusing condition of the lens system with respect to the object;
    (d) aural indication means coupled to said automatic focusing device to aurally indicate the focusing condition of the lens system with respect to the object;
    guide means for guiding the visual information generated by the visual indication means into the camera body, and
    disabling means for disabling said visual indication means in association with the photographing operation of the camera body.

4. A lens assembly for use with a camera body, comprising:
    (a) a focus adjustable lens system;
    (b) focus detecting means for detecting the focusing condition of said lens system with respect to an object and for producing an output indicative of the focusing condition of the lens system; and
    (c) indication means responsive to the output of said detecting means to indicate aurally and visually the focusing condition of said lens system with respect to the object; and
    guide means for guiding the visual indication information generated by said indication means into the camera body.

5. A lens assembly according to claim 4, further comprising:
    disabling means coupled to said indication means for partially disabling the indication means.

6. A lens assembly according to claim 5, wherein said disabling means is arranged to disable the visual indication of said indication means.

7. A lens assembly according to claim 6, wherein said disabling means is arranged to disable the visual indication of said indication means in association with a photographic operation of the camera body.

* * * * *